United States Patent
Friestad et al.

(10) Patent No.: US 6,729,250 B2
(45) Date of Patent: May 4, 2004

(54) COUPLING FOR A FLEXIBLE ROTATABLE DRIVE SHAFT

(75) Inventors: Michael Eric Friestad, Rock Island, IL (US); Kevin Hause, Binghamton, NY (US)

(73) Assignees: Deere & Company, Moline, IL (US); Elliott Manufacturing Co. LLC, Binghamton, NY (US)

( * ) Notice: Subject to any disclaimer, the term of this patent is extended or adjusted under 35 U.S.C. 154(b) by 0 days.

(21) Appl. No.: 10/214,964

(22) Filed: Aug. 8, 2002

(65) Prior Publication Data

US 2004/0025764 A1 Feb. 12, 2004

(51) Int. Cl.$^7$ ............................. A01L 7/00; A01B 33/14
(52) U.S. Cl. ............................................ 111/177; 74/13
(58) Field of Search ....................... 74/13, 14; 172/105; 111/158, 170, 174, 200, 903, 921, 922, 149, 157, 160, 77; 221/211, 278

(56) References Cited

U.S. PATENT DOCUMENTS

| | | | |
|---|---|---|---|
| 718,664 A | 1/1903 | Shearer | |
| 2,963,913 A | 12/1960 | Wensloff | 74/15.6 |
| 4,779,471 A | 10/1988 | Rettig | 74/13 |
| 6,170,412 B1 * | 1/2001 | Memory et al. | 111/174 |
| 6,604,475 B2 * | 8/2003 | Peterson et al. | 111/177 |

FOREIGN PATENT DOCUMENTS

| | | |
|---|---|---|
| EP | 0 482 739 A2 | 4/1992 |
| GB | 899733 | 6/1962 |
| GB | 1146591 | 3/1969 |

OTHER PUBLICATIONS

Elliott Manufacturing Brochure, "Flexible Rotary Power Transmission Handbook, No. 327", front and back cover including 20 pages, printed in the U.S.A., no date.

Elliott Manufacturing Brochure, "The Experienced Company with New Ideas in Power Transmission" 1 page front and back, printed in the U.S.A., no date.

Stow Manufacturing Co. Brochure, "Stow Flexible Shafts and Flexible Couplings", 9$^{th}$ Edition, front and back cover including 39 pages, printed in the U.S.A., no date.

* cited by examiner

*Primary Examiner*—Robert E. Pezzuto

(57) ABSTRACT

A flexible rotatable drive shaft is provided with a first male coupling that is received in a second female coupling located on a gearbox. The male coupling has two circumferential grooves that define a first fully engaged position and a second intermediate engaged position. In both engaged positions the male coupler is mounted to the gearbox, however only in the fully engaged position is the flexible rotatable drive shaft in a driving relationship with the gearbox. The female coupler is provided with a latch pin for selectively engaging the first and second circumferential grooves. The latch pin is provided with a circumferential surface for engaging the grooves and latching the flexible rotatable drive shaft to the gearbox and a recessed section for unlatching the flexible rotatable drive shaft from the gearbox.

22 Claims, 2 Drawing Sheets

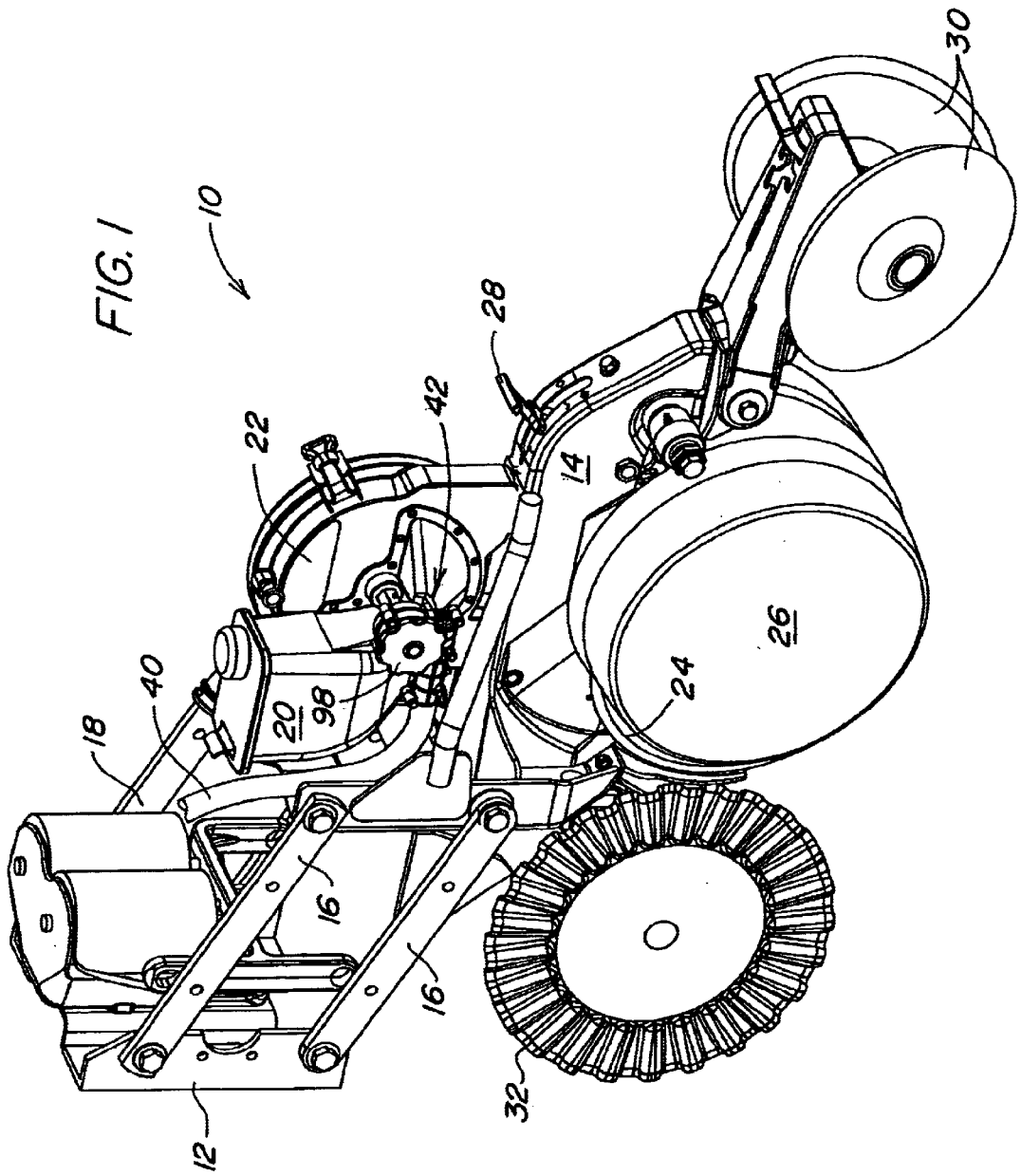

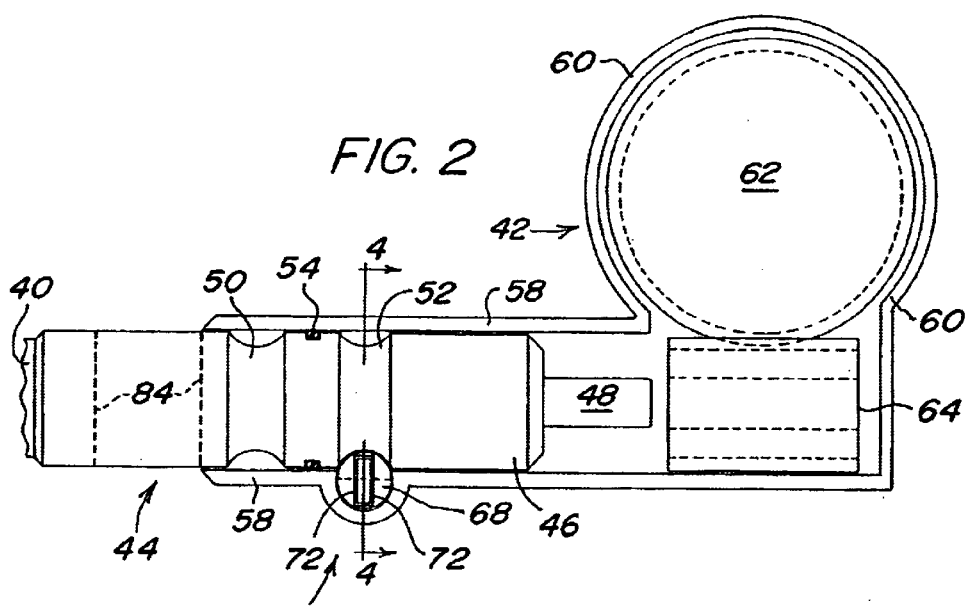
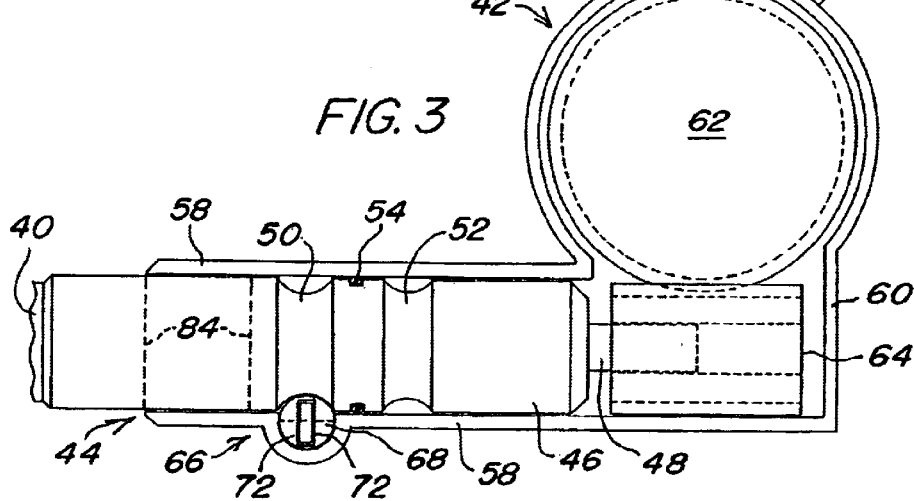
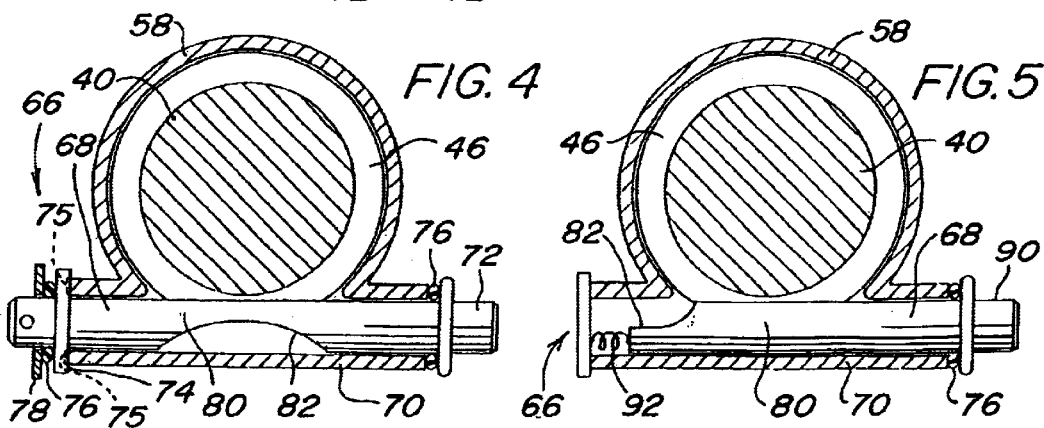

COUPLING FOR A FLEXIBLE ROTATABLE DRIVE SHAFT

FIELD OF THE INVENTION

The present invention is directed to a coupling for a flexible rotatable drive shaft and a gearbox having a fully engaged position and an intermediate engaged position.

BACKGROUND OF THE INVENTION

Flexible rotatable drive shafts have been used in a variety of applications to transmit rotational force from one location to another. Traditionally, the flexible rotatable drive shaft has a male coupling for engaging a female coupling on a gearbox. When the male coupling engages the female coupling the flexible rotatable drive shaft is in a driving relationship with the gearbox. When the couplings are no longer coupled to one another the flexible rotatable drive shaft is no longer in a driving relationship with the gearbox. Thus the couplings have two positions, a fully engaged position and a disengaged position.

Flexible rotatable drive shafts have been proposed for use on agricultural seeding machines, see U.S. Pat. Nos. 718,664, and 4,779,471.

SUMMARY

It is an object of the present invention to prove a coupling system for a flexible rotatable drive shaft having a first fully engaged position wherein the flexible rotatable drive shaft is in a driving relationship with a gearbox and a second intermediate engaged position wherein the flexible rotatable drive shaft engages the gearbox, but is no longer in a driving relationship with the gearbox.

A flexible rotatable drive shaft is provided with a first male coupling that is received in a second female coupling located on a gearbox. The male coupling has two circumferential grooves that define a first fully engaged position and a second intermediate engaged position. An O-ring seal is positioned between the two circumferential grooves. A male drive member protrudes axially outward from the flexible rotatable drive shaft and engages a female drive member on the gearbox when the male coupling is in its fully engaged position. In both engaged positions the male coupler is mounted to the gearbox and the O-ring seal is in contact with the female coupler sealing the gearbox housing into which the male coupler is mounted.

The female coupler is provided with a latch pin for selectively engaging the first and second circumferential grooves. The latch pin is provided with a circumferential surface for engaging the grooves and latching the flexible rotatable drive shaft to the gearbox by engaging the selected circumferential groove. The latch pin is also provided with a recessed section for unlatching the flexible rotatable drive shaft from the gearbox. In a first embodiment the circumferential surface of the latch pin is rotated into and out of engagement with the circumferential grooves. In a second embodiment, circumferential surface of the latch pin slides into and out of engagement with the circumferential grooves.

BRIEF DESCRIPTION OF THE DRAWINGS

FIG. 1 is a rear perspective view of a seeding machine comprising an individual planting unit.

FIG. 2 is a cross sectional view of the gear box and rotatable drive shaft wherein the drive shaft is in its intermediate disengaged position.

FIG. 3 is a cross sectional view of the gear box and rotatable drive shaft wherein the drive shaft is in its fully engaged position FIG. 4 is a cross sectional view of the rotatable latching pin.

FIG. 5 is a cross sectional view of the slidable latching pin.

DETAILED DESCRIPTION

The seeding machine 10 comprises an individual row crop planting unit that is mounted to a transverse toolbar, not shown, by U-bolts that engage a mounting plate 12. The planting unit is provided with a frame 14 that is coupled to the mouthing plate 12 by a parallel linkage 16. The parallel linkage 16 allows the planting unit to move up and down to a limited degree relative to the toolbar. Seed is automatically directed to the planter by a pneumatic seed on demand delivery system. The seed on demand delivery system directs the seed pneumatically from a main hopper, not shown, through seed hose 18 to an auxiliary hopper 20 mounted on fame 14. Seed in the auxiliary hopper 20 is metered by a seed meter 22 and directed to a planting furrow by a seed tube, not shown.

The planting furrow is formed by a double disc furrow opener 24 having depth gauging wheels 26. The depth of the planting furrow is controlled by the positioning of handle 28 which controls the vertical position of the depth gauging wheels 26 relative to the furrow opener 24. The planting furrow with metered seed deposited therein by the seed tube is closed by closing wheels 30. A forward mounted coulter 32 is used for slicing through crop residue before it encounters the furrow opener 24.

The seed meter 22 is driven by a flexible rotatable drive shaft 40 that drives gear box 42. The flexible and rotatable drive shaft 40 is of a type manufactured and marketed by Elliott Manufacturing Company, LLC. of Binghamton, N.Y. A ground driven transmission, not shown, provides a rotational input into the flexible drive shaft 40. In this way the ground speed of the seeding machine 10 controls the speed of the seed meter 22. The flexible rotatable drive shaft 40 comprises a flexible outer sheath and a rotatable inner core. The end of the flexible rotatable drive shaft is provided with a male coupling 44 comprising a ferrule 46 and a faceted rotatable male drive member 48. The ferrule 46 is a metal sleeve having a first circumferential groove 50 and a second circumferential groove 52. An O-ring seal 54 is positioned between the circumferential grooves 50 and 52.

The gearbox 42 comprises a housing having a ferrule receiving portion 58 and a gear receiving portion 60. Two helical gears 62 and 64 are mounted in the gear receiving portion 60 of the housing. The first helical gear 62 is drivingly coupled to the seed meter 22. The second helical gear 64 is drivingly coupled to the first helical gear 62. The second helical gear 64 is provided with a multifaceted bore that receives the male drive member 48 of the flexible rotatable drive shaft 40. When the drive shaft 40 is in its fully engaged position, illustrated in FIG. 3, the second helical gear 64 is driven by the flexible rotatable drive shaft 40.

The cylindrical ferrule receiving portion 58 is provided with a latch 66 comprising a transverse pin 68. In the embodiment illustrated in FIGS. 2–4, the pin 68 is rotatively positioned in a transverse bore 70 located on the ferrule receiving portion 58 of the gearbox housing. The pin 68 has a first end with two operator engaging surfaces 72 and a second end having a cross pin 74 that is biased towards the bore 70 by a compressible and resilient O-rings 76 and a washer 78. The end of the bore 70 adjacent to the cross pin 74 is provided with detents 75. The detents are located on both sides of the transverse bore 70 to define a single fixed position for the pin 68, wherein the pin 68 can be rotated into a latched or unlatched position. To move the pin 68 between positions, the operator engages the operator engaging surfaces 72 and pushes the pin 68 inwardly to compress the O-ring 76 releasing the cross pin 74 from the detents 75. The pin 68 is then rotated to the desired position held in place by the cross pin 74 and the detents 75.

The pin 68 has a circumferential surface 80 defining a latching position and a recessed section 82 defining a delatching position. In its latching position, the circumferential surface 80 engages one of the first or second circumferential grooves 50 or 52 to either latch the rotatable drive shaft into its fully engaged position or its intermediate disengaged position. In its delatching position, the recessed section 82 frees the ferrule 46 and allows it to slide axially within the ferrule receiving portion 58 of the gearbox housing until it is latched into its selected position. To facilitate locating the ferrule 46 within the ferrule receiving portion 58 of the gearbox housing, the ferrule is provided with visual indicators 84. When the visual indicators 84 are aligned with the edge of the ferrule receiving portion 58 of the gearbox housing one of the first and second circumferential grooves 50 and 52 of the ferrule 46 is correctly axially positioned for engagement by the circumferential surface 80 of the pin 68.

In an alternative embodiment the rotatable pin 68 is replaced with a slide pin 90. The slide pin 90 is located in bore 80 and biased into engagement with the circumferential grooves 50 and 52 by spring 92. As with the rotatable pin 68, the slide pin 90 has a circumferential surface 80 and a recessed section 82. To release the ferrule 46, the slide pin 90 is drawn outwardly until the recessed section registers with the circumferential grooves 50 and 52, the rotatable drive shaft 40 can then be moved axially within the ferrule receiving portion 58 of the gearbox housing.

The ferrule 46 forms a male coupling that engages the female coupling formed by the ferrule receiving portion 58 of the gearbox 42. The first circumferential groove 50 defines the fully engaged position of the flexible rotatable shaft 40. In the fully engaged position the flexible rotatable shaft 40 is drivingly coupled to he gearbox 42 for driving the seed meter 22. The second circumferential groove 52 defines an intermediate engaged position of the flexible rotatable shaft 40. In the intermediate engaged position, the flexible rotatable shaft 40 is coupled to the ferrule receiving portion 58 of the gearbox housing, but it is not drivingly coupled to the second helical gear 64, as illustrated in FIG. 2. In both engaged positions the O-ring 54 located between the circumferential grooves 50 and 52 engages the inner wall of the ferrule receiving portion 58 of the gearbox housing sealing the gearbox housing 42 from the outside elements. In its fully disengaged position the flexible rotatable drive shaft 40 is removed from the gearbox 42.

An operator knob 98 is mounted for the gearbox 42 for manually rotating the seed meter 22. In addition this knob 98 can be used to move the second helical gear so that it registers with the male driving member 48 when it is inserted into the gearbox housing 42.

Having described the preferred embodiment, it will become apparent that various modifications can be made without departing from the scope of the invention as defined in the accompanying claims.

What is claimed is:

1. A transmission for an agricultural machine, the transmission comprising:
    a flexible rotatable drive shaft having a first coupling, the first coupling having a fully engaged position and an intermediate engaged position;
    a gearbox having a second coupling which can be coupled to the first coupling, the gearbox having a gear, the gear is drivingly connected to the flexible rotatable drive shaft when the first coupling is in its fully engaged position relative to the second coupling, when the first coupling is in its fully engaged position relative to the second coupling the flexible rotatable drive shaft is mounted to the gearbox, when the first coupling is in its intermediate engaged position the flexible rotatable drive shaft is mounted to the gearbox, but the gear is not drivingly connected to the flexible rotatable drive shaft;
    a latch is mounted to the gearbox for selectively maintaining the first coupling in one of the fully engaged position and the intermediate engaged position.

2. A transmission as defined by claim 1 wherein the first coupling is provided with a first circumferential groove defining the fully engaged position and a second circumferential groove defining the intermediate engaged position.

3. A transmission as defined by claim 2 wherein the latch comprises a pin that is mounted to the gear box for selectively engaging one of the first and second circumferential grooves.

4. A transmission as defined by claim 3 wherein the first coupling comprises a male coupling that is slidably received in the second coupling that forms a female coupling.

5. A transmission as defined by claim 4 wherein an O-ring seal is positioned between the first and second circumferential grooves and is in contact with the first and second couplings wherein the first coupling is in its fully engaged and intermediate engaged positions.

6. A transmission as defined by claim 5 wherein the pin is rotatively mounted to the gearbox, the pin is provided with a circumferential surface for engaging the first and second circumferential grooves latching the flexible rotatable drive shaft to the gear box, the circumferential surface defining a latching position for the pin, the pin is also provided with a recessed section that allows the first coupling to be moved relative to the second coupling, the recessed section defining a delatching position for the pin.

7. A transmission as defined by claim 6 wherein the first coupling is provided with a visual indicator indicating the intermediate engaged position of the first coupling relative to the second coupling.

8. A transmission as defined by claim 7 wherein the pin is provided with a cross pin that bears against a detent on the gearbox when the pin is in its latching position and its delatching position.

9. A transmission as defined by claim 8 wherein the pin has a first end having operator engagement surfaces and a second end having a washer, an O-ring is positioned between the washer and the gearbox for biasing the cross pin of the pin into the detent.

10. A transmission as defined by claim 5 wherein the pin is slidably mounted to the gearbox, the pin is provided with a circumferential surface for engaging the first and second circumferential grooves latching the flexible rotatable drive shaft to the gear box, the circumferential surface defining a latching position for the pin, the pin is also provided with a recessed section that allows the first coupling to be moved relative to the second coupling, the recessed section defining a delatching position for the pin.

11. A transmission as defined by claim 10 wherein a spring biases the pin into its latching position.

12. An agricultural seeding machine for planting a crop, the seeding machine comprising:

a frame;

a seed meter is mounted to the frame for metering seed to be planted;

a furrow opener is mounted to the frame for forming a seed trench in a field into which metered seed from the seed meter is directed;

a gearbox having a gear drives the seed meter, the gearbox is provided with a second coupling for receiving a first coupling of a flexible rotatable drive shaft, the first coupling has a fully engaged position relative to the second coupling and an intermediate engaged position relative to the second coupling, the gear is drivingly connected to the flexible rotatable drive shaft when the first coupling is in its fully engaged position relative to the second coupling, when the first coupling is in its fully engaged position the flexible rotatable drive shaft is mounted to the gearbox, when the first coupling is in its intermediate engaged position the flexible rotatable drive shaft is mounted to the gearbox, but the gear is not drivingly connected to the flexible rotatable drive shaft, and a latch is mounted to the gearbox for selectively maintaining the first coupling in one of the fully and intermediate engaged positions.

13. An agricultural seeding machine as defined by claim 12 wherein the first coupling is provided with a first circumferential groove defining the fully engaged position and a second circumferential groove defining the intermediate engaged position.

14. An agricultural seeding machine as defined by claim 13 wherein the latch comprises a pin that is mounted to the gear box for selectively engaging one of the first and second circumferential grooves.

15. An agricultural seeding machine as defined by claim 14 wherein the first coupling comprises a male coupling that is slidably received in the second coupling that forms a female coupling.

16. An agricultural seeding machine as defined by claim 15 wherein an O-ring seal is positioned between the first and second circumferential grooves and is in contact with the first and second couplings wherein the first coupling is in its fully engaged and intermediate engaged positions.

17. An agricultural seeding machine as defined by claim 16 wherein the pin is rotatively mounted to the gearbox, the pin is provided with a circumferential surface for engaging the first and second circumferential grooves latching the flexible rotatable drive shaft to the gear box, the circumferential surface defining a latching position for the pin, the pin is also provided with a recessed section that allows the first coupling to be moved relative to the second coupling, the recessed section defining a delatching position for the pin.

18. An agricultural seeding machine as defined by claim 17 wherein the first coupling is provided with a visual indicator indicating the intermediate engaged position of the first coupling relative to the second coupling.

19. An agricultural seeding machine as defined by claim 18 wherein the pin is provided with a cross pin that bears against a detent on the gearbox when the pin is in its latching position an its delatching position.

20. An agricultural seeding machine as defined by claim 19 wherein the pin has a first end having operator engagement surfaces and a second end having a washer, an O-ring is positioned between the washer and the gearbox for biasing the cross pin of the pin into the detent.

21. An agricultural seeding machine as defined by claim 16 wherein the pin is slidably mounted to the gearbox, the pin is provided with a circumferential surface for engaging the first and second circumferential grooves latching the flexible rotatable drive shaft to the gear box, the circumferential surface defining a latching position for the pin, the pin is also provided with a recessed section that allows the first coupling to be moved relative to the second coupling, the recessed section defining a delatching position for the pin.

22. An agricultural seeding machine as defined by claim 21 wherein a spring biases the pin into its latching position.

\* \* \* \* \*